(12) United States Patent
Dan

(10) Patent No.: US 11,637,948 B2
(45) Date of Patent: Apr. 25, 2023

(54) IMAGE CAPTURING APPARATUS, IMAGE PROCESSING APPARATUS, IMAGE PROCESSING METHOD, IMAGE CAPTURING APPARATUS CALIBRATION METHOD, ROBOT APPARATUS, METHOD FOR MANUFACTURING ARTICLE USING ROBOT APPARATUS, AND RECORDING MEDIUM

(71) Applicant: CANON KABUSHIKI KAISHA, Tokyo (JP)

(72) Inventor: Keita Dan, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 16/871,593

(22) Filed: May 11, 2020

(65) Prior Publication Data
US 2020/0366814 A1     Nov. 19, 2020

(30) Foreign Application Priority Data

May 17, 2019 (JP) .............................. JP2019-094047

(51) Int. Cl.
*H04N 5/14* (2006.01)
*H04N 5/232* (2006.01)
*H04N 5/341* (2011.01)

(52) U.S. Cl.
CPC ........... *H04N 5/14* (2013.01); *H04N 5/23254* (2013.01); *H04N 5/341* (2013.01)

(58) Field of Classification Search
CPC ...... G02B 7/28–40; G02B 7/09; G02B 7/102; G02B 7/36; G03B 3/00–12;
(Continued)

(56) References Cited

U.S. PATENT DOCUMENTS

2013/0201298 A1\* 8/2013 Laudo .................. H04N 13/225
348/49
2016/0044229 A1\* 2/2016 Hamada ............. H04N 5/23212
(Continued)

FOREIGN PATENT DOCUMENTS

JP    2003-042732 A    2/2003
JP    2009-284188 A    12/2009
(Continued)

OTHER PUBLICATIONS

Zhenguyou Zhang, A flexible new technique for camera calibration, IEEE Transactions on Pattern Analysis and Machine Intelligence, vol. 22, No. 11, Nov. 2000, pp. 1330-1334.

*Primary Examiner* — Xi Wang
(74) *Attorney, Agent, or Firm* — Canon U.S.A., Inc. IP Division

(57) ABSTRACT

An image capturing apparatus including a lens and a processing unit, wherein the lens includes a first region through which a first light ray passes and a second region through which a second light ray passes, wherein the first region and the second region are arranged in a predetermined direction, and wherein the processing unit sets a component of the predetermined direction as a degree of freedom in a first relative positional relationship between a predetermined position in the first region and a predetermined position in the second region is employed.

20 Claims, 11 Drawing Sheets

(58) Field of Classification Search
CPC . G06T 2207/20228; G06T 2207/10024; G06T 1/20; G06F 3/017; H04N 5/23212
USPC ........................................ 250/201.6; 359/698
See application file for complete search history.

(56) References Cited

U.S. PATENT DOCUMENTS

2016/0267666 A1* 9/2016 Kim ........................... G06T 1/20
2021/0323171 A1* 10/2021 Pivac ..................... B25J 9/1687

FOREIGN PATENT DOCUMENTS

| JP | 2013-072772 A | 4/2013 |
| JP | 2016-169989 A | 9/2016 |
| JP | 2017-40549 A | 2/2017 |
| JP | 2017-167126 A | 9/2017 |
| JP | 2018-128397 A | 8/2018 |

* cited by examiner

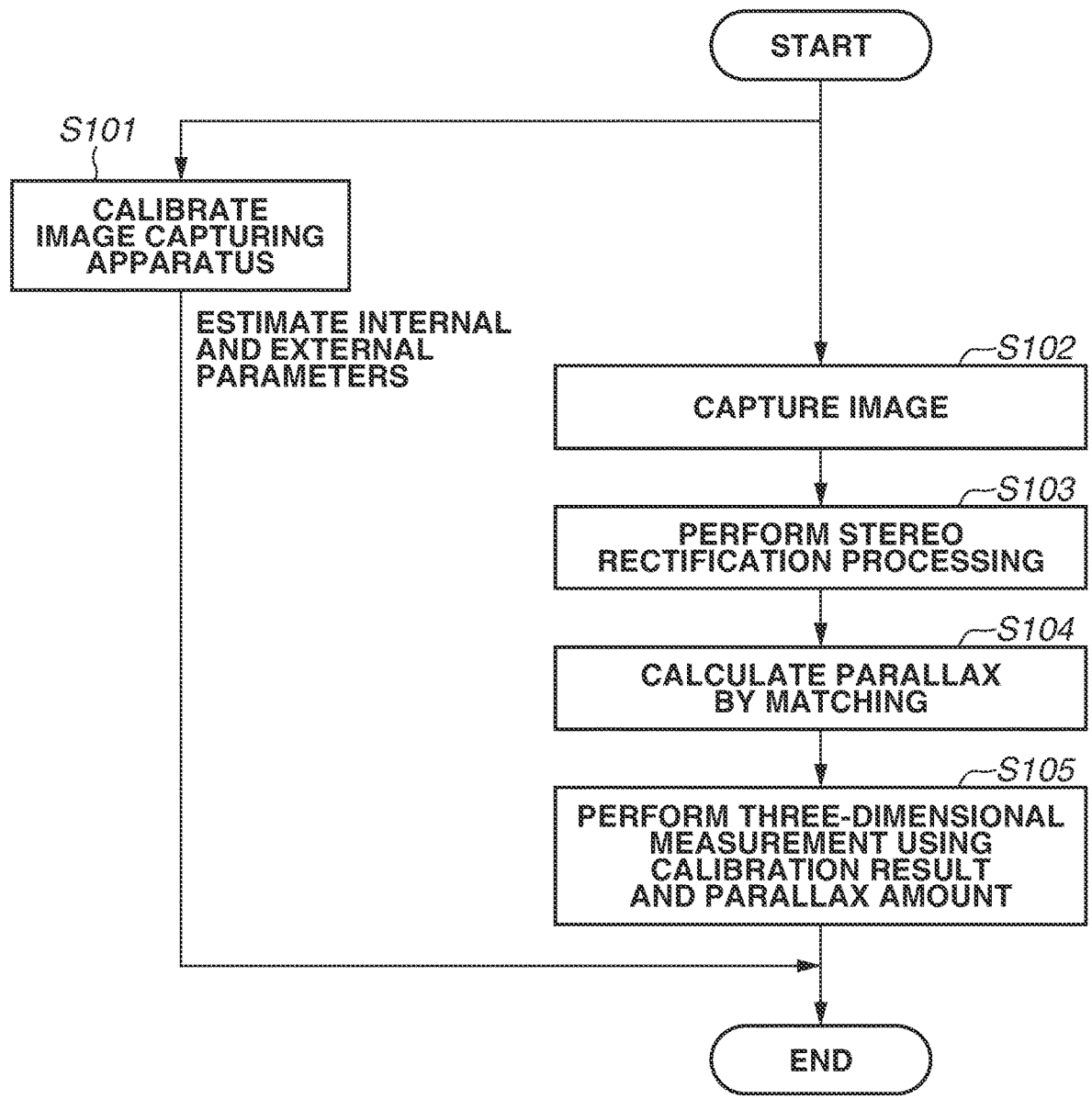

W: WORLD COORDINATE SYSTEM

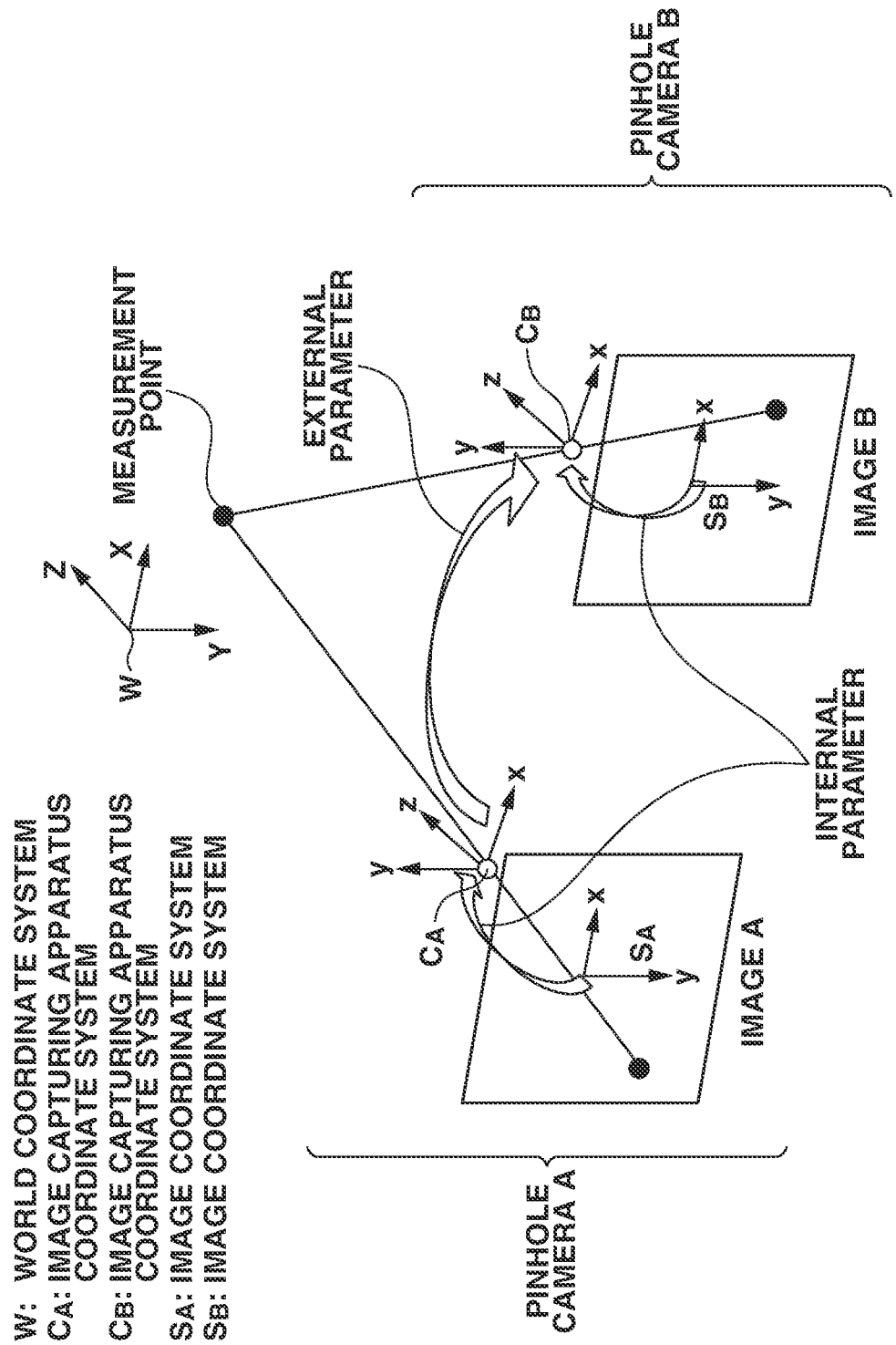

IMAGE CAPTURING APPARATUS, IMAGE PROCESSING APPARATUS, IMAGE PROCESSING METHOD, IMAGE CAPTURING APPARATUS CALIBRATION METHOD, ROBOT APPARATUS, METHOD FOR MANUFACTURING ARTICLE USING ROBOT APPARATUS, AND RECORDING MEDIUM

BACKGROUND OF THE INVENTION

Field of the Invention

The aspect of the embodiments relates to an image capturing apparatus.

Description of the Related Art

Production apparatuses that operate a predetermined target object using a robot apparatus and perform an assembly operation are widely used. The production apparatuses that use a robot apparatus and a vision sensor in combination to pick or assemble a target object with great accuracy are known.

SUMMARY OF THE INVENTION

According to an aspect of the embodiments, an image capturing apparatus includes a lens and a processing unit, wherein the lens includes a first region through which a first light ray passes and a second region through which a second light ray passes, wherein the first region and the second region are arranged side by side in a predetermined direction, and wherein the processing unit sets a component of the predetermined direction as a degree of freedom in a first relative positional relationship between a predetermined position in the first region and a predetermined position in the second region.

Further features of the disclosure will become apparent from the following description of exemplary embodiments with reference to the attached drawings.

BRIEF DESCRIPTION OF THE DRAWINGS

FIG. 6 is a flowchart illustrating a control process in three-dimensional measurement according to an exemplary embodiment.

FIG. 10 illustrates a model of an image capturing apparatus as a stereo camera with two pinhole cameras A and B arranged.

DESCRIPTION OF THE EMBODIMENTS

Figure 1:
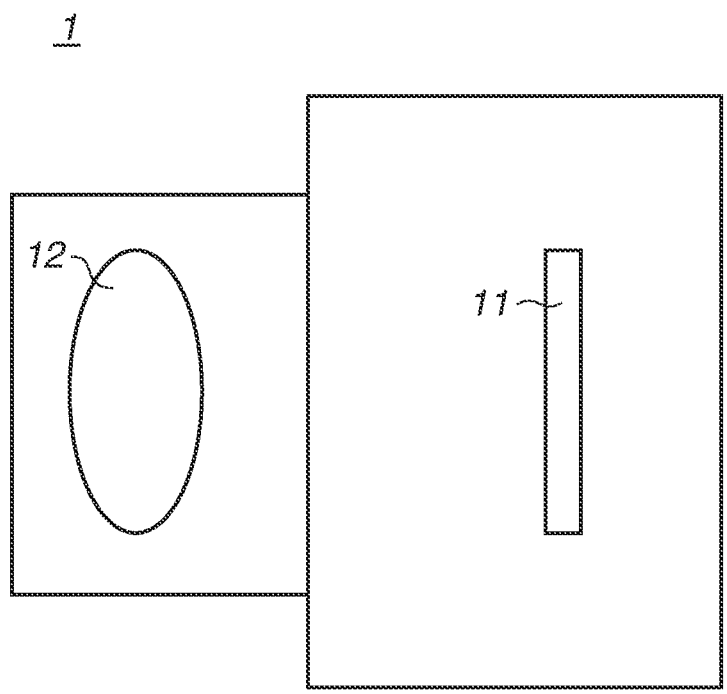
FIG. 1 is a schematic view illustrating an image capturing apparatus according to an exemplary embodiment.

An example of a vision sensor that is widely used is an image capturing apparatus that measures the distance of a measurement target based on the triangulation principle, such as a stereo camera. To perform three-dimensional measurement in XYZ directions using such an image capturing apparatus, internal and external parameters of the image capturing apparatus are to be obtained in advance. The internal and external parameters will be described below with reference to FIG. 10.

FIG. 10 illustrates a model of an image capturing apparatus as a stereo camera with two pinhole cameras A and B arranged. Each pinhole position is an optical center, and an image is formed at a position where a straight line that goes through a measurement point of a space and an optical center intersects an image plane (image A, image B). Each optical center is set as an origin, and a direction that passes through the optical center and is orthogonal to the image plane is set as a z-axis in FIG. 10. Accordingly, an XY plane is the image plane. This coordinate system will be referred to as "image capturing apparatus coordinate system $(C_A, C_B)$". Further, the position of the image capturing apparatus in a predetermined space is indicated by a world coordinate system W. The distance from the optical center to the image plane corresponds to a focal length of a lens.

Further, a coordinate system having an intersection (image center) of a perpendicular line extending downward from the optical center to the image plane and the image plane as an origin and horizontal and vertical axes of the image being set as xy axes will be referred to as "image coordinate system $(S_A, S_B)$". The internal parameter is a parameter that indicates the relative relationship between the image coordinate system $(S_A, S_B)$ and the image capturing apparatus coordinate system $(C_A, C_B)$. Specifically, the internal parameter specifies optical characteristics of the image capturing apparatus and is expressed using image center, focal length, cell (pixel) size, and lens distortion characteristics.

On the other hand, the external parameter indicates the relative relationship between the image capturing apparatus coordinate system $C_A$ of the pinhole camera A and the image capturing apparatus coordinate system $C_B$ of the pinhole camera B and is determined by the relative positions and orientations of the pinhole cameras A and B. When the internal and external parameters are determined and the measurement points in the images captured respectively by the two pinhole cameras A and B are matched, the parallax of the measurement points is determined. This enables three-dimensional measurement based on the triangulation principle.

For highly accurate three-dimensional measurement, the relative relationship between the image coordinate system $(S_A, S_B)$ and the image capturing apparatus coordinate system $(C_A, C_B)$ is important, and thus the internal and external parameters are to be calculated with great accuracy. However, in order to measure the internal and external parameters directly with great accuracy, optical characteristics of the cameras are to be measured precisely, but it is significantly difficult to directly measure the optical characteristics. In response thereto, Z Zhang, "A flexible new technique for camera calibration", (IEEE Transactions on Pattern Analysis and Machine Intelligence, Vol. 22, No. 11, pages 1330-1334) discusses a method for calculating internal and external parameters. Specifically, images of a calibration chart of a known shape are captured by two cameras for which the internal and external parameters are to be calculated, and coordinates on an image coordinate system are calculated. Then, the calculated coordinates are fitted to a predetermined model. In this method, the external parameter that indicates the relative positions and orientations of the two cameras are modeled at six degrees of freedom, namely three translation components and three rotation components in XYZ directions, and then the external parameters are calculated.

Figure 11A:
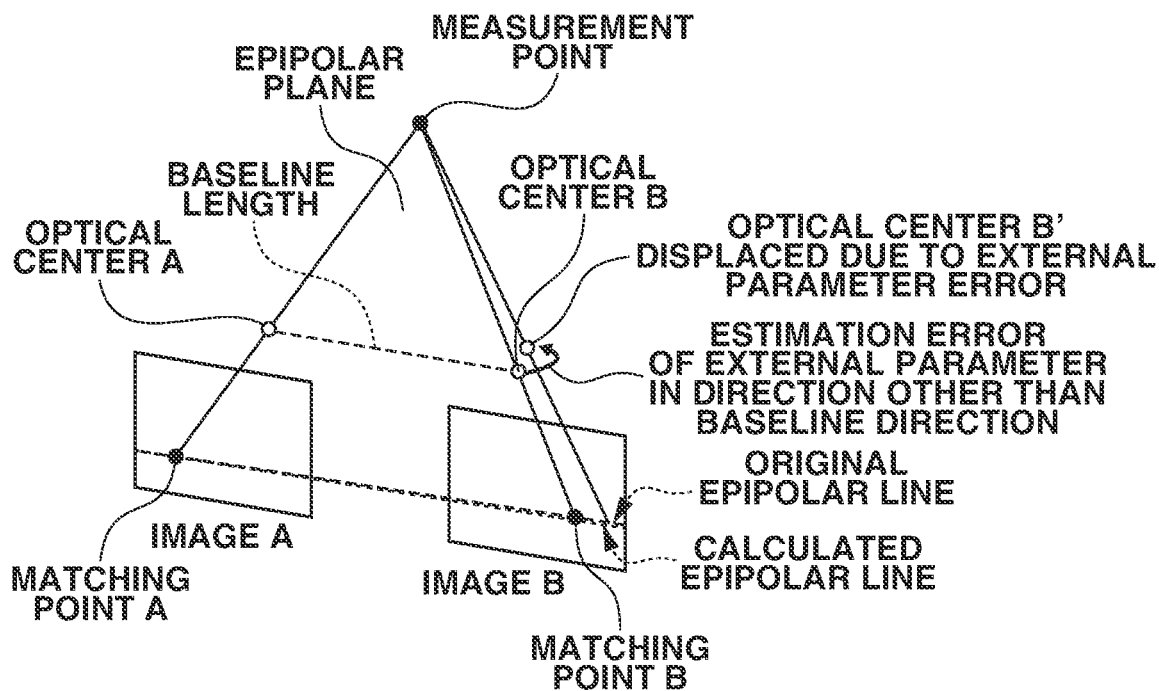
FIGS. 11A and 11B illustrate in detail a cause of a displacement of a calculated epipolar line due to an estimation error of an external parameter.
Figure 11B:
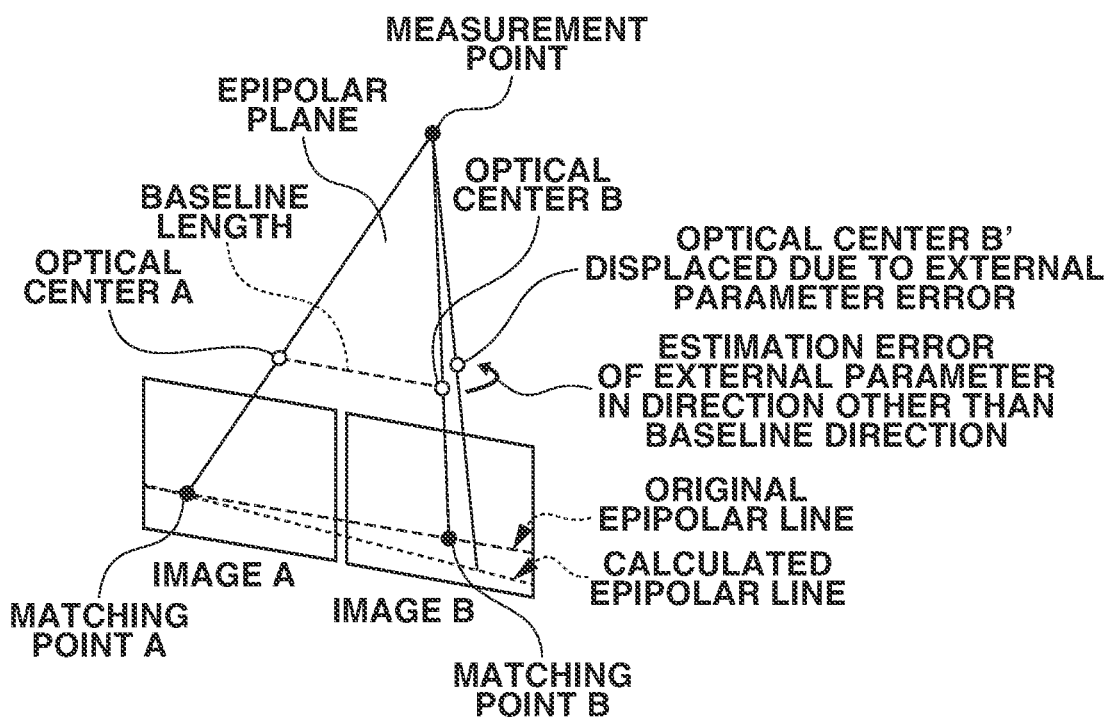

However, in a case where internal and external parameters of an image capturing apparatus that has a short baseline length are calculated using a method as discussed in Z. Zhang, "A flexible new technique for camera calibration", (IEEE Transactions on Pattern Analysis and Machine Intelligence, Vol. 22, No. 11, pages 1330-1334), even a small estimation error of the external parameter in a direction other than a baseline direction leads to a significant displacement of an epipolar line that is determined by calibration. This results in low measurement accuracy at a measurement point. FIGS. 11A and 11B illustrate in detail a cause of a displacement of a calculated epipolar line due to an estimation error of an external parameter. FIG. 11A illustrates a case where the baseline length is long, whereas FIG. 11B illustrates a case where the baseline length is short.

As illustrated in FIGS. 11A and 11B, an epipolar line is an intersection line of an image plane (image A, image B) and an epipolar plane that passes through optical centers A and B of two image capturing apparatuses and a measurement point. Further, the baseline length is a line segment that connects the optical center A of an image capturing apparatus A and the optical center B of an image capturing apparatus B, and the baseline direction is the direction of the connection. The external parameter determines the relative positional relationship between the optical centers A and B.

Further, projection points of the measurement point on the images A and B are respectively referred to as "matching points A and B". In matching the matching points A and B, a constraint condition that the projection points on the images (image A, image B) captured by the two cameras A and B are on the epipolar line is satisfied, so that points on the epipolar line are searched in calculating the matching point A or B.

In a case where the baseline length of a camera is relatively long as illustrated in FIG. 11A, even if an estimation error of the external parameter in a direction other the baseline direction occurs and the relative positional relationship between the optical centers A and B changes, the epipolar plane is not inclined much, so that the epipolar line is not displaced significantly. Thus, calculating the matching points A and B using the calculated epipolar line does not significantly affect the measurement accuracy of the measurement point.

On the other hand, in a case where the baseline length of a camera is short as illustrated in FIG. 11B, even a small estimation error of the external parameter in a direction other than the baseline direction leads to a change in the relative positional relationship between the optical centers A and B, and the epipolar plane is significantly inclined. Consequently, the epipolar line is significantly displaced from an original epipolar line. Thus, in a case where an external parameter of a camera having a short baseline length is calculated using a model, even a small error of the external parameter leads to a significant displacement of the epipolar line. This gives rise to an issue that matching of the matching points A and B fails and the three-dimensional measurement accuracy decreases significantly.

In view of the above-described issue, the aspect of the embodiments is directed to an image capturing apparatus capable of performing measurement with great accuracy even in a case where the image capturing apparatus has a short baseline length and a method for calculating an external parameter using a model is applied to the image capturing apparatus.

Various exemplary embodiments of the disclosure will be described below with reference to the attached drawings. It should be noted that the below-described exemplary embodiments are mere examples and a person skilled in the art can change, for example, a configuration of a detail as needed without departing from the spirit of the disclosure. Further, each numerical value specified in the below-described exemplary embodiments is merely for reference and is not intended to limit the scope of the disclosure.

FIG. 1 is a schematic view illustrating an image capturing apparatus 1 according to a first exemplary embodiment. The image capturing apparatus 1 according to the present exemplary embodiment is an image capturing apparatus configured to perform three-dimensional measurement using an image capturing plane phase-difference method. In the image capturing apparatus that employs the image capturing plane phase-difference method, each pixel of an image sensor includes two photoelectric conversion units (photodiodes). In the image capturing plane phase-difference method, a pair of images (images A and B in FIGS. 10 and 11) formed by light fluxes having passed through two different regions (partial pupils) of an exit pupil of an optical system of the image capturing apparatus are acquired. Then, a parallax is calculated from the images A and B, and the distance to a measurement point is measured using the parallax based on the triangulation principle described above with reference to FIGS. 10 and 11. In the present exemplary embodiment, an image capturing apparatus that employs the image capturing plane phase-difference method is desirable. Details thereof will be described below.

Figure 2A:
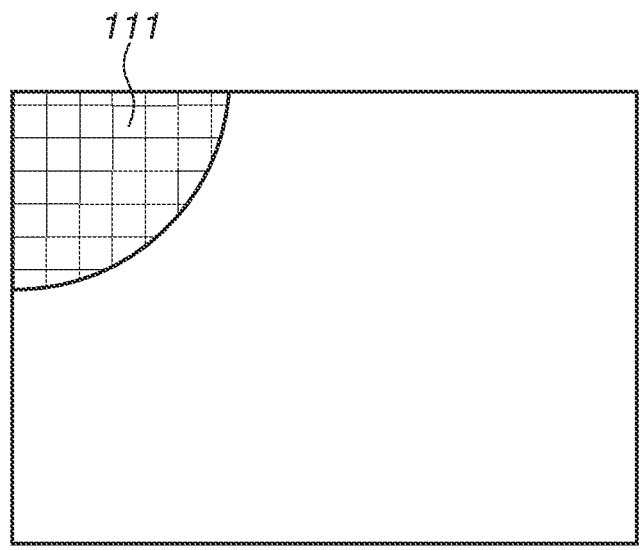
FIGS. 2A and 2B are schematic views illustrating an image sensor and an image capturing pixel according to an exemplary embodiment.
Figure 2B:
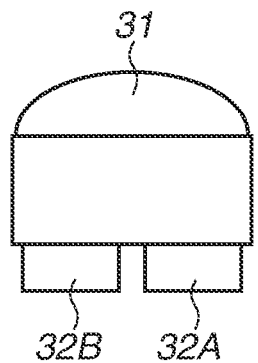

As illustrated in FIG. 1, the image capturing apparatus 1 includes an image sensor 11 and a lens 12 and forms an optical image of a subject on the image sensor 11 via the lens 12. FIGS. 2A and 2B are views illustrating the image sensor 11 according to the present exemplary embodiment in detail. FIG. 2A illustrates an arrangement of pixels 111 for image capturing on an image capturing surface of the image sensor 11, and FIG. 2B illustrates a structure of each pixel 111 for image capturing.

As illustrated in FIG. 2A, the image sensor 11 includes a large number of pixels 111 for image capturing arranged therein. To avoid complication, only an upper left portion of the pixel arrangement is illustrated, and illustration of the entire pixel arrangement on the image sensor 11 is omitted. Further, as illustrated in FIG. 2B, each pixel 111 for image capturing includes a microlens 31 and two photoelectric conversion elements 32A and 32B such as photodiodes. The pixels 111 for image capturing are arranged on the entire surface of the image sensor 11.

Figure 3:
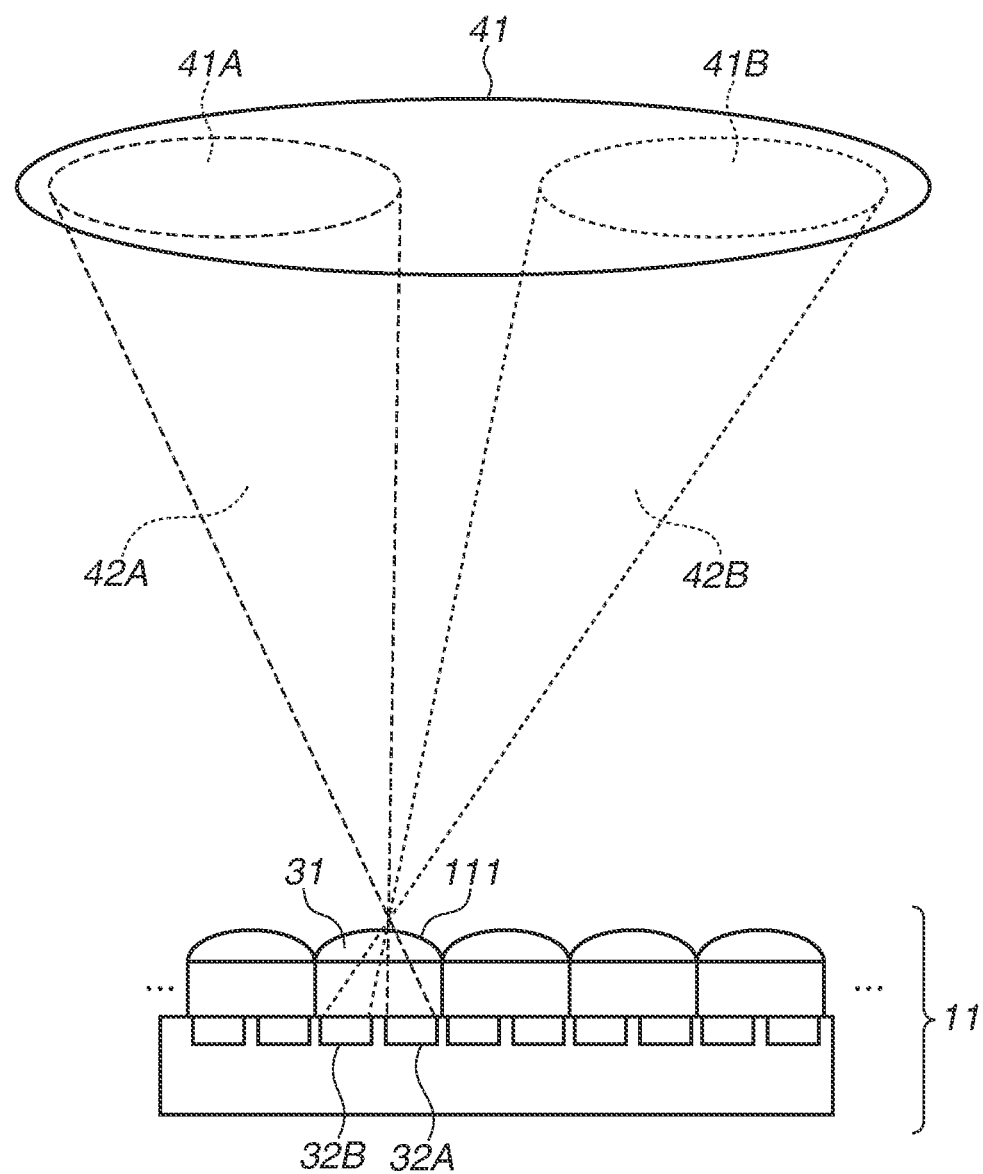
FIG. 3 is a view illustrating a configuration of an image capturing apparatus according to an exemplary embodiment.

FIG. 3 is a view illustrating the two regions of the exit pupil of the optical system of the image sensor 1 in detail. As illustrated in FIG. 3, a light flux 42A having passed through a first pupil region 41A of an exit pupil 41 enters the photoelectric conversion element 32A, and a light flux 42B having passed through a second pupil region 41B of the exit pupil 41 enters the photoelectric conversion element 32B. The first and second pupil regions 41A and 41B are different regions of the exit pupil 41. Thus, the photoelectric conversion element 32A of each pixel 111 for image capturing acquires an image signal A (hereinafter, "image A"), and the photoelectric conversion element 32B of each pixel 111 for image capturing acquires an image signal B (hereinafter, "image B").

As described above, the images A and B of two different directions are acquired with the single image sensor and the single lens, and this enables three-dimensional measurement of a measurement point based on the triangulation principle.

Figure 4:
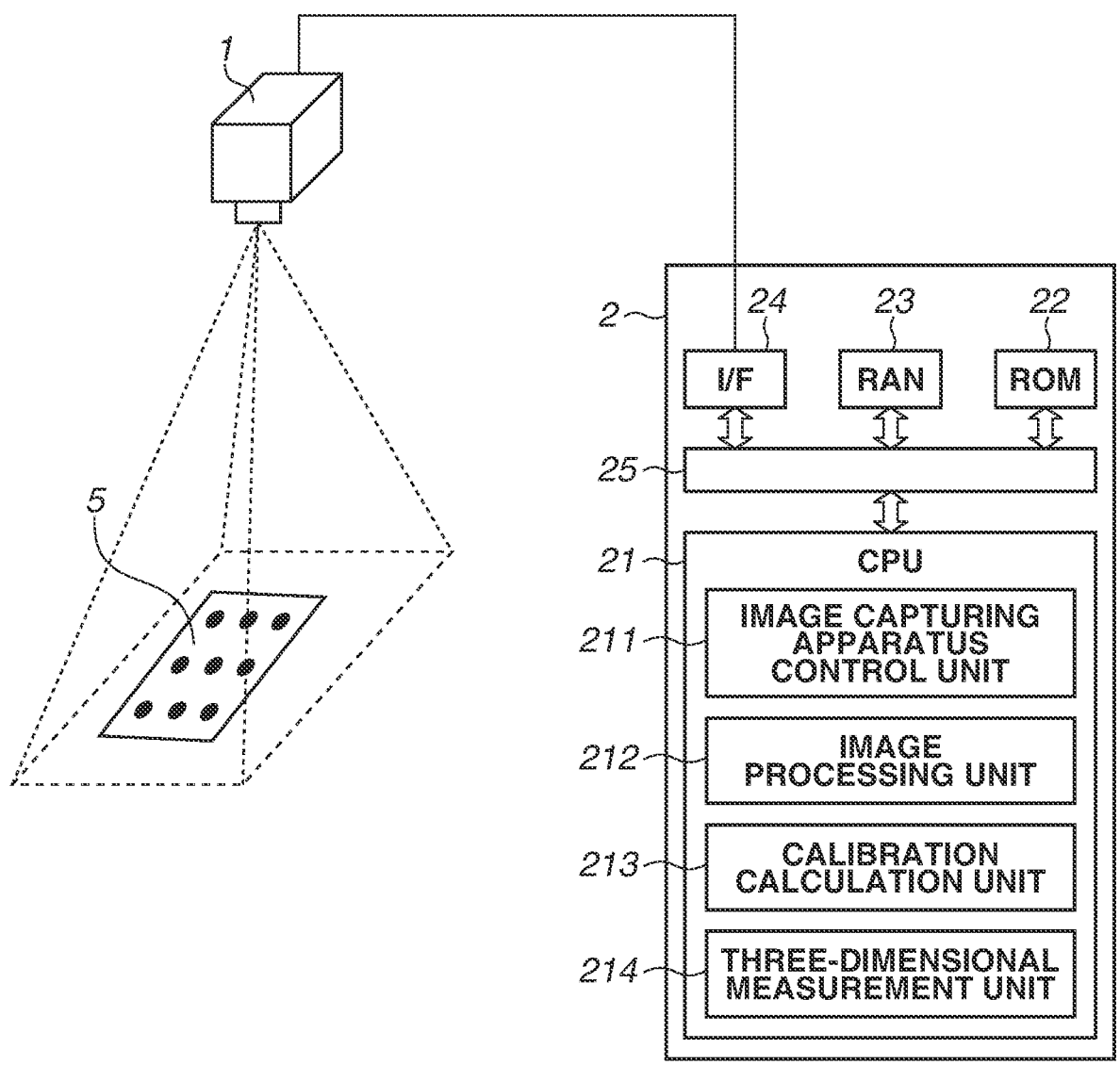
FIG. 4 is a schematic view illustrating an image capturing apparatus and an image processing apparatus according to an exemplary embodiment.

Next, a calibration apparatus configured to calibrate internal and external parameters in three-dimensional measurement using the image capturing apparatus 1 will be described below with reference to FIG. 4. As illustrated in FIG. 4, the image capturing apparatus 1 is connected to an image processing apparatus 2. The image processing apparatus 2 includes functional blocks (211 to 214) configured to capture an image by the image capturing apparatus 1, process the captured image, calibrate the internal and external parameters of the image capturing apparatus 1 using the processing result, and perform three-dimensional measurement. The image capturing apparatus 1 captures an image of a calibration chart 5 and acquires data for the calibration of the internal and external parameters based on the captured image of the calibration chart 5.

The image processing apparatus 2 mainly includes a central processing unit (CPU) 21. The image processing apparatus 2 includes the CPU 21, a memory unit, and an interface (I/F) unit 24. The CPU 21 performs calculation. The memory unit includes a read-only memory (ROM) 22 and a random access memory (RAM) 23. The I/F unit 24 performs external communication. The functional blocks are connected to each other via a bus 25 used in internal communication of the image processing apparatus 2. The CPU 21 executes a control program to thereby realize the functional blocks (211 to 214).

The image capturing apparatus 1 is connected to the image processing apparatus 2 via the I/F unit 24. The image capturing apparatus 1 captures an image based on an instruction from an image capturing apparatus control unit 211 and transmits the images A and B, which are the captured images, to the image processing apparatus 2. Further, the image capturing apparatus control unit 211 also includes a function of turning on/off a light (not illustrated) and adjusting luminance.

The transmitted images A and B are processed by an image processing unit 212 of the image processing apparatus 2. The image processing unit 212 performs image processing on the images A and B so that data for the calibration of the internal and external parameters is acquired. In the present exemplary embodiment, a method for measuring a central position of each black-circle marker on the calibration chart 5 will be described below. In the present exemplary embodiment, the calibration chart 5 is an apparatus that has a white background and a large number of black circular markers drawn on the white background. It should be noted that the calibration chart 5 is not limited to circular markers and can be given an image pattern of a chessboard or checkerboard.

First, the image capturing apparatus 1 captures images of the calibration chart 5 to acquire the images A and B of the calibration chart 5 and transmits the acquired images A and B to the image processing unit 212. Then, the image processing unit 212 performs edge extraction processing on the image A transmitted from the image capturing apparatus 1. In the edge extraction processing in the present exemplary embodiment, an edge of each marker of the calibration chart 5 is extracted based on the length and roundness of each edge. Ellipse approximation is performed on the extracted edge so that the image coordinates of an ellipse center are obtained. The image coordinates are a marker center position in the image A. Similar processing is performed on the image B so that a marker center position in the image B is obtained. The marker center position in the image A is an image coordinate system $S_A$, and the marker center position in the image B is an image coordinate system $S_B$.

An calibration calculation unit 213 of the image processing apparatus 2 includes a function of calculating the internal and external parameters of the image capturing apparatus 1. A calculation method will be described below. The internal and external parameters calculated by the calibration calculation unit 213 are stored on a memory in the image processing apparatus 2, e.g., the ROM 22 or the RAM 23.

A three-dimensional measurement unit 214 of the image processing apparatus 2 includes a function of matching projection points in the images A and B and performing three-dimensional measurement using the internal and external parameters. The processing that relates to the three-dimensional measurement method that is performed by the three-dimensional measurement unit 214 will be described below.

Figure 5:
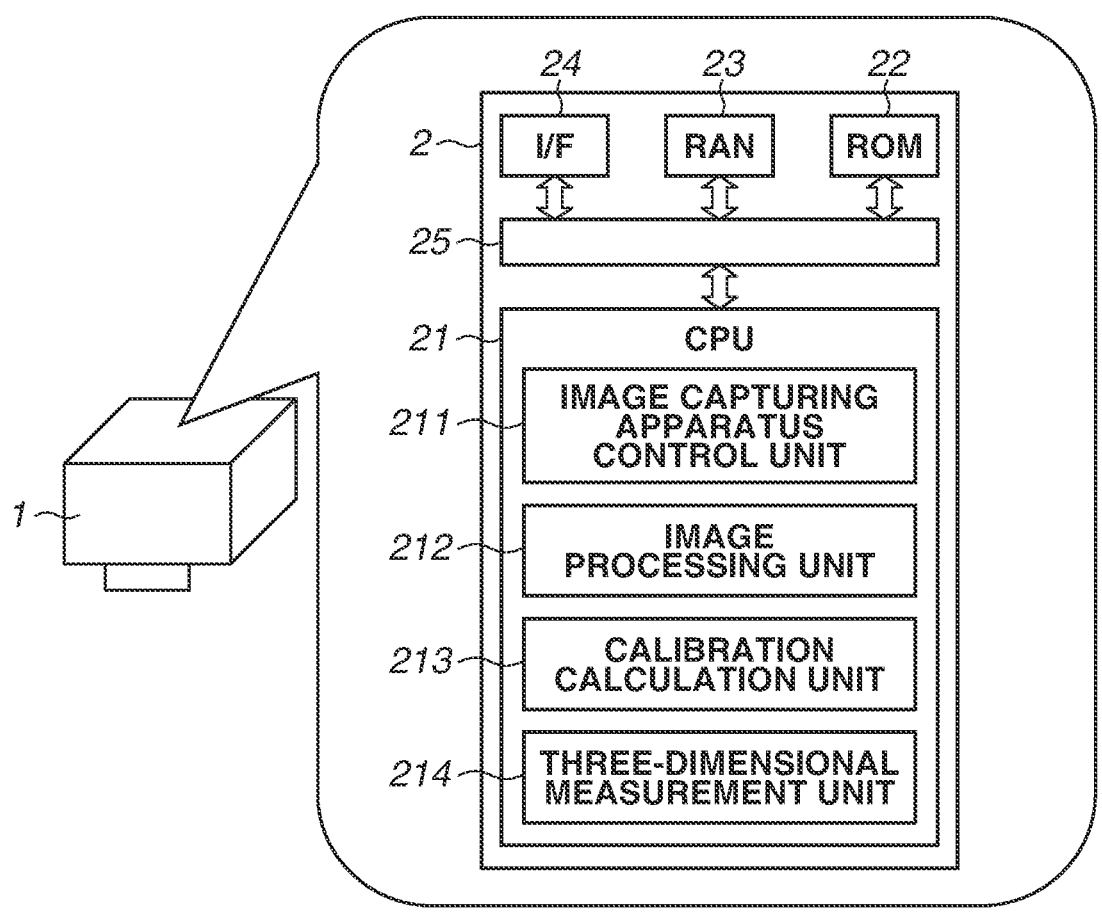
FIG. 5 is a schematic view illustrating an image capturing apparatus and an image processing apparatus according to a modified example of an exemplary embodiment.

While the image processing apparatus 2 and the image capturing apparatus 1 are separate apparatuses in the present exemplary embodiment as illustrated in FIG. 4, a configuration of a smart camera in which the image capturing apparatus 1 includes the functions of the image processing apparatus 2 as illustrated in FIG. 5 can be employed. With this configuration, the image processing apparatus 2 does not have to be installed separately, so that the installation space is reduced. Further, with the configuration illustrated in FIG. 5, an operation of wiring between the image capturing apparatus 1 and the image processing apparatus 2 is unnecessary, so that the activation time of the apparatus is reduced and human-resource costs are also reduced.

Next, a control process in the three-dimensional measurement that is performed by the image capturing apparatus 1 according to the present exemplary embodiment will be described below with reference to FIG. 6. FIG. 6 is a flowchart illustrating a control process in the three-dimensional measurement according to the present exemplary embodiment. The entire process is roughly divided into an off-line operation (step S101) and an on-line operation (steps S102 to S105).

Step S101, which is an off-line task, is a preparation operation that is performed by an operator, and the calibration calculation unit 213 executes the processing of step S101. This processing is performed only once unless the optical characteristics of the image capturing apparatus 1 change. Step S101 is to be performed again if, for example, the operator re-adjusts the focus of the image capturing apparatus 1 or a shock is applied to the image capturing apparatus 1 and changes the optical characteristics of the image capturing apparatus 1. In step S101, the image capturing apparatus 1 is calibrated, and the internal and external parameters are set. The set internal and external parameters are stored on the memory, and the preparation operation is ended.

Steps S102 to S105 performed by an on-line operation are to be performed each time the three-dimensional measurement is performed using the image capturing apparatus 1, and the three-dimensional measurement unit 214 performs the processing of steps S102 to S105. For example, in a case of a system in which a workpiece is held using a robot apparatus and the held workpiece is attached to another workpiece to manufacture an article, the processing is performed each time a workpiece is supplied and a holding operation is performed. Specifically, the position and orientation of the workpiece are measured using the image capturing apparatus 1, and the position and orientation of the robot apparatus are corrected based on the measurement result, and the held workpiece is attached to another workpiece.

Next, step S101 in which the image capturing apparatus 1 is calibrated will be described below. In step S101, the image capturing apparatus 1 is calibrated, and the internal and external parameters of the image capturing apparatus 1 are acquired. The internal and external parameters in a case where the image capturing apparatus 1 according to the present exemplary embodiment is used will be described below with reference to FIG. 7.

Figure 7A:
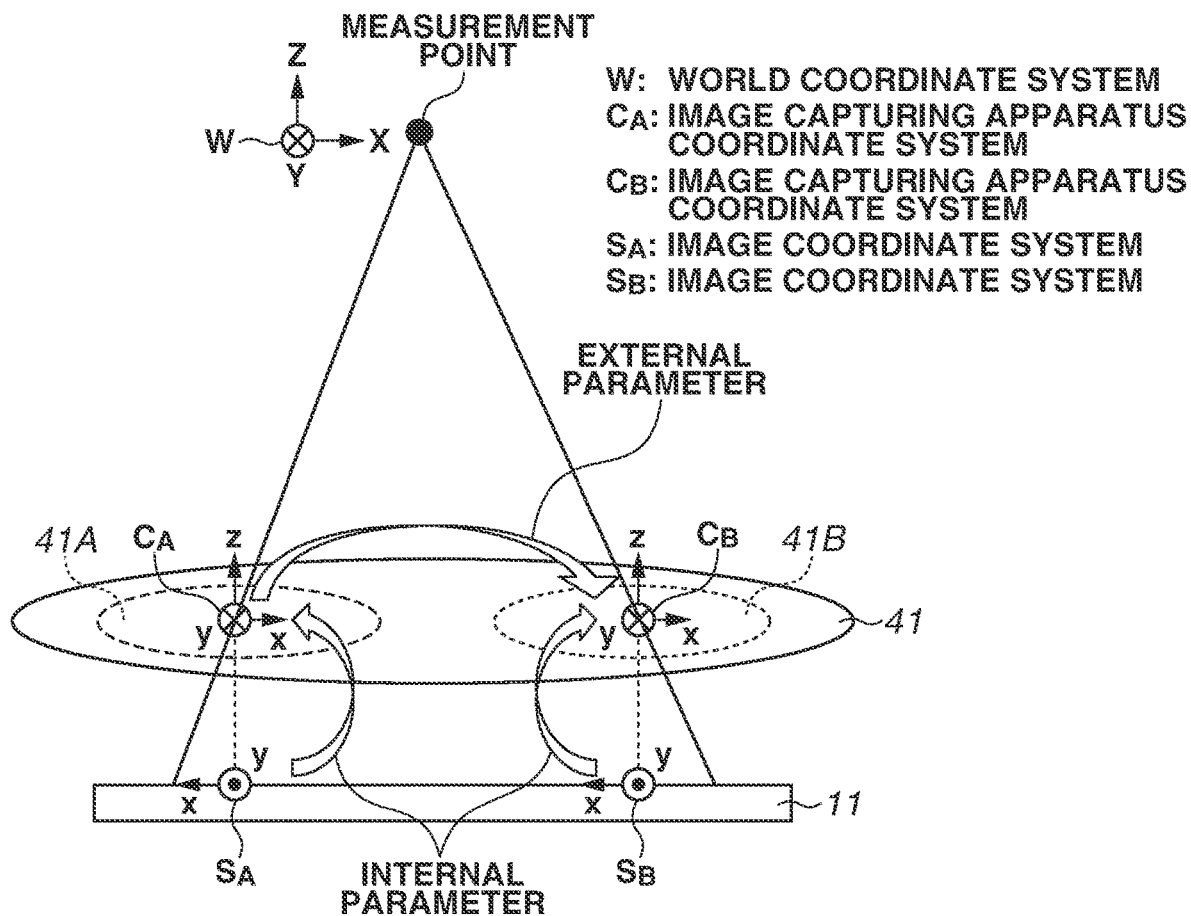
FIGS. 7A, 7B, and 7C illustrate internal and external parameters in a case where an image capturing apparatus 1 according to an exemplary embodiment is used.
Figure 7B:
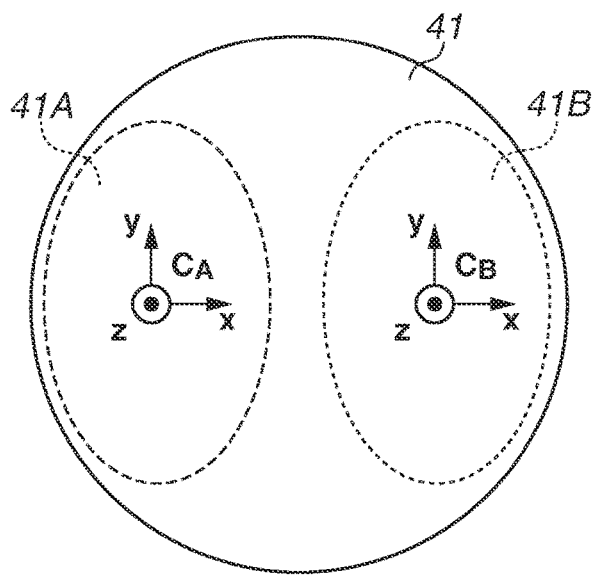
Figure 7C:
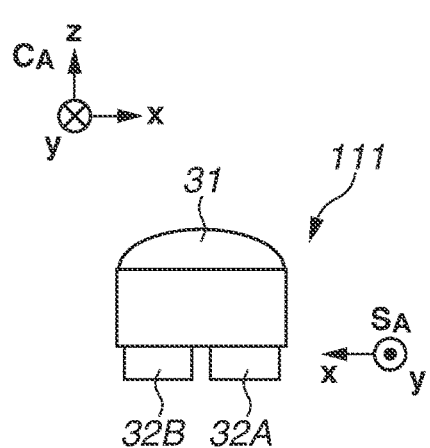

FIGS. 7A, 7B, and 7C illustrate a relationship between coordinate systems in the case where the image capturing apparatus 1 according to the present exemplary embodiment is used. FIG. 7A is a view illustrating the exit pupil 41 according to the present exemplary embodiment along a YZ plane. FIG. 7B is a view illustrating the exit pupil 41 along an XY plane. FIG. 7C is a view illustrating the pixel 111 for image capturing along an XZ plane. First, the image capturing apparatus coordinate system ($C_A$, $C_B$) and the image coordinate system ($S_A$, $S_B$) will be described below. As described above, the image A is an image signal formed by a light flux that has passed through the first pupil region 41A of the exit pupil 41 and is received on the image sensor 11, and the image B is an image signal formed by a light flux that has passed through the second pupil region 41B of the exit pupil 41 and is received on the image sensor 11. The first pupil region 41A and the second pupil region 41B are different regions of the exit pupil 41.

Thus, optical centers are respectively the position of the center of gravity of the first pupil region 41A and the position of the center of gravity of the second pupil region 41B. The position of the center of gravity of the first pupil region 41A is the position of the origin of the image capturing apparatus coordinate system $C_A$, and the position of the center of gravity of the second pupil region 41B is the position of the origin of the image capturing apparatus coordinate system $C_B$. The optical center of the image capturing apparatus coordinate system $C_A$ will be referred to as "optical center A", and the optical center of the image capturing apparatus coordinate system $C_B$ will be referred to as "optical center B". The direction of a perpendicular line from the optical center A to the image sensor 11 is a z-axis of the image capturing apparatus coordinate system $C_A$, and the direction of a perpendicular line from the optical center B to the image sensor 11 is a z-axis of the image capturing apparatus coordinate system $C_B$. The distance from the optical center A to the image sensor 11 and the distance from the optical center B to the image sensor 11 are focal lengths.

As illustrated in FIG. 7B, in the present exemplary embodiment, the direction from the image capturing apparatus coordinate system $C_A$ to the image capturing apparatus coordinate system $C_B$ is defined as an x-axis of the image capturing apparatus coordinate systems $C_A$ and $C_B$.

An intersection of the perpendicular line from the optical center A to the image sensor 11 and the image sensor 11 is the position of the origin of the image coordinate system $S_A$, and the position of the origin will be referred to as "image center A". Further, an intersection of the perpendicular line from the optical center B to the image sensor 11 and the image sensor 11 is the position of the origin of the image coordinate system $S_B$, and the position of the origin will be referred to as "image center B". As illustrated in FIG. 7C, in the present exemplary embodiment, the direction in which the photoelectric conversion elements 32A and 32B are arranged (x-axis direction in FIG. 7C) is defined as an x-axis of the image coordinate systems $S_A$ and $S_B$. After the correction of lens distortion, the x-axis of the image coordinate systems $S_A$ and $S_B$ and the x-axis of the image capturing apparatus coordinate systems $C_A$ and $C_B$ become parallel.

Next, the internal and external parameters will be described below. In a method for setting the internal and external parameters, a method for modeling the image capturing apparatus 1 is used. The internal parameter is a parameter that indicates the relative positional relationship between the image coordinate systems $S_A$ and $S_B$ and the image capturing apparatus coordinate systems $C_A$ and $C_B$. Specifically, the internal parameter specifies optical characteristics of the image capturing apparatus 1 and is expressed using image center, focal length, cell (pixel) size, and lens distortion characteristics.

The coordinates (u', v') measured in the image coordinate systems $S_A$ and $S_B$ before the correction of lens distortion can be converted using lens distortion characteristics into the coordinates (u, v) after the correction of lens distortion by the following expression:

$$u = u'u'(K_1 r^2 + K_2 r^4 + K_3 r^6) + 2P_1 u'v' + P_2(r^2 + 2u'^2)$$

$$v = v'v'(K_1 r^2 + K_2 r^4 + K_3 r^6) + P_1(r^2 + 2v'^2) + 2P_2 u'v'.$$ [Formula 1]

In formula 1, $K_1$, $K_2$, and $K_3$ are distortion coefficients in the radius direction, and $P_1$ and $P_2$ are distortion coefficients in the circumferential direction, and the distortion coefficients are parameters of the lens distortion characteristics. The radius r is expressed by the following expression:

$$r = \sqrt{u'^2 + v'^2}.$$ [Formula 2]

The following internal parameter matrices $A_A$ and $A_B$ are determined by the internal parameter other than the lens distortion characteristics:

$$A_A = \begin{pmatrix} f_A k_A & 0 & u_{A0} \\ 0 & f_A k_A & v_{A0} \\ 0 & 0 & 1 \end{pmatrix}$$ [Formula 3]

and $$A_B = \begin{pmatrix} f_B k_B & 0 & u_{B0} \\ 0 & f_B k_B & v_{B0} \\ 0 & 0 & 1 \end{pmatrix}.$$ [Formula 4]

In formulas 3 and 4, $f_A$ and $f_B$ are respectively the focal lengths of the pupil regions 41A and 41B, $k_A$ and $k_B$ are the cell (pixel) sizes of the image sensor 11, ($u_{A0}$, $v_{A0}$) are the image center of the image coordinate system $S_A$, and ($u_{B0}$, $v_{B0}$) are the image center of the image coordinate system $S_B$.

Further, the external parameter is the relative relationship between the image capturing apparatus coordinate systems $C_A$ and $C_B$, and in a case where there are two image capturing apparatuses, the external parameter is modeled at six degrees of freedom, and an external parameter matrix E is expressed by the following expression:

$$E = \begin{pmatrix} & & t_1 \\ & R & t_2 \\ & & t_3 \end{pmatrix}. \quad \text{[Formula 5]}$$

In formula 5, R is a rotation matrix and is expressed with three degrees of freedom, and ($t_1$, $t_2$, $t_3$) are parallel translation components.

Next, a relational expression that is satisfied between measurement point coordinates $m_A = (u_A, V_A)$ on the image coordinate system $S_A$ and measurement point coordinates $m_B = (u_B, V_B)$ on the image coordinate system $S_A$ will be described below using an internal parameter matrix and an external parameter matrix. The following matrix is defined using ($t_1$, $t_2$, $t_3$), which is a portion of the external parameter:

$$T = \begin{pmatrix} 0 & -t_3 & t_2 \\ t_3 & 0 & -t_1 \\ -t_2 & t_1 & 0 \end{pmatrix}. \quad \text{[Formula 6]}$$

It is generally known that at this time the measurement point coordinates $m_A$ of the image coordinate system $S_A$ and the measurement point coordinates $m_B$ of the image coordinate system $S_B$ geometrically satisfy the following relational expression:

$$m_A{}^T(A_A{}^{-1})^T TR A_B{}^{-1} m_B = 0 \quad \text{[Formula 7]}$$

At this time, a matrix F is defined as:

$$F = (A_A{}^{-1})^T TR A_E{}^{-1}. \quad \text{[Formula 8]}$$

Using the matrix F, formula 7 is expressed as:

$$m_A{}^T F m_B = 0 \quad \text{[Formula 9]}$$

The matrix F is referred to as "fundamental matrix", and formula 9 is referred to as "fundamental equation". The fundamental matrix F has nine components, but there is a degree of freedom of a constant multiple, so that it can be considered that the number of unknowns is eight. Thus, in theory, if eight or more sets of matching point data ($m_A$, $m_B$) are known, the fundamental matrix F is determined. Further, it is generally known that in theory, if there are five known points in the world coordinate system W, the internal and external parameters are derived from the fundamental matrix F.

In reality, however, an error can occur in image measurement of a feature point position during calibration, or a lens distortion characteristic that is part of the internal parameter can fail to match a real lens distortion characteristic. Thus, with theoretical number of pieces of matching point data alone, a significant estimation error of the internal and external parameters can occur. Therefore, in a general calibration method, the internal and external parameters are estimated by optimization calculation using more pieces of matching point data.

In the present exemplary embodiment, the image capturing apparatus 1 employs the single lens and is constrained under a predetermined condition, and the two optical centers are less likely to be relatively displaced. In view of the optical characteristics of the image capturing apparatus 1, an external parameter matrix E' is defined as follows. Then, the external parameter is modeled only with a translation component $t_1$ of the x-axis that is the direction in which the photoelectric conversion elements 32A and 32B are arranged as shown by Formula 10:

$$E' = \begin{pmatrix} 1 & 0 & 0 & t_1 \\ 0 & 1 & 0 & 0 \\ 0 & 0 & 1 & 0 \end{pmatrix}. \quad \text{[Formula 10]}$$

Why the external parameter can be modeled only with the translation component $t_1$ of the x-axis as described above will be described in detail below. In the image capturing apparatus that employs the image capturing plane phase-difference method, the images A and B are image signals formed by the same lens 12 and the same image sensor 11. Thus, as illustrated in FIG. 7B, the y-coordinate of the position of the center of gravity of the first pupil region 41A and the y-coordinate of the position of the center of gravity of the second pupil region 41B in the world coordinate system W are substantially equal. Specifically, the y-coordinate of the optical center A of the pupil region 41A and the y-coordinate of the optical center B of the pupil region 41B are substantially equal values.

Further, the focal lengths of the first pupil region 41A and the second pupil region 41B are substantially equal, so that the z-coordinates of the optical centers A and B in the world coordinate system W are also substantially equal values. In other words, the y- and z-coordinates of the optical center A (the origin of the image capturing apparatus coordinate system $C_A$) and the optical center B (the origin of the image capturing apparatus coordinate system $C_B$) in the world coordinate system W are substantially equal values. Thus, the external parameter is modeled only with the translation component $t_1$ of the x-direction.

Using the external parameter matrix E' of formula 10, formula 6 is converted into:

$$T' = \begin{pmatrix} 0 & 0 & 0 \\ 0 & 0 & -t_1 \\ 0 & t_1 & 0 \end{pmatrix}. \quad \text{[Formula 11]}$$

Using the matrix, formula 7 is converted into:

$$m_A{}^T(A_A{}^{-1})^T T' A_E{}^{-1} m_B = 0. \quad \text{[Formula 12]}$$

Accordingly, the fundamental matrix F and the fundamental equation are expressed as:

$$F' = (A_A{}^{-1})^T T' A_B{}^{-1}, \quad \text{[Formula 13]}$$

and $$m_A{}^T F' m_B = 0. \quad \text{[Formula 14]}$$

In the present exemplary embodiment, matching point data is substituted into the fundamental equation of formula 14, and the internal and external parameters are estimated. In this way, the internal and external parameters are calculated. The above-described processing is performed by the image processing unit 212 and the calibration calculation unit 213.

Figure 8:
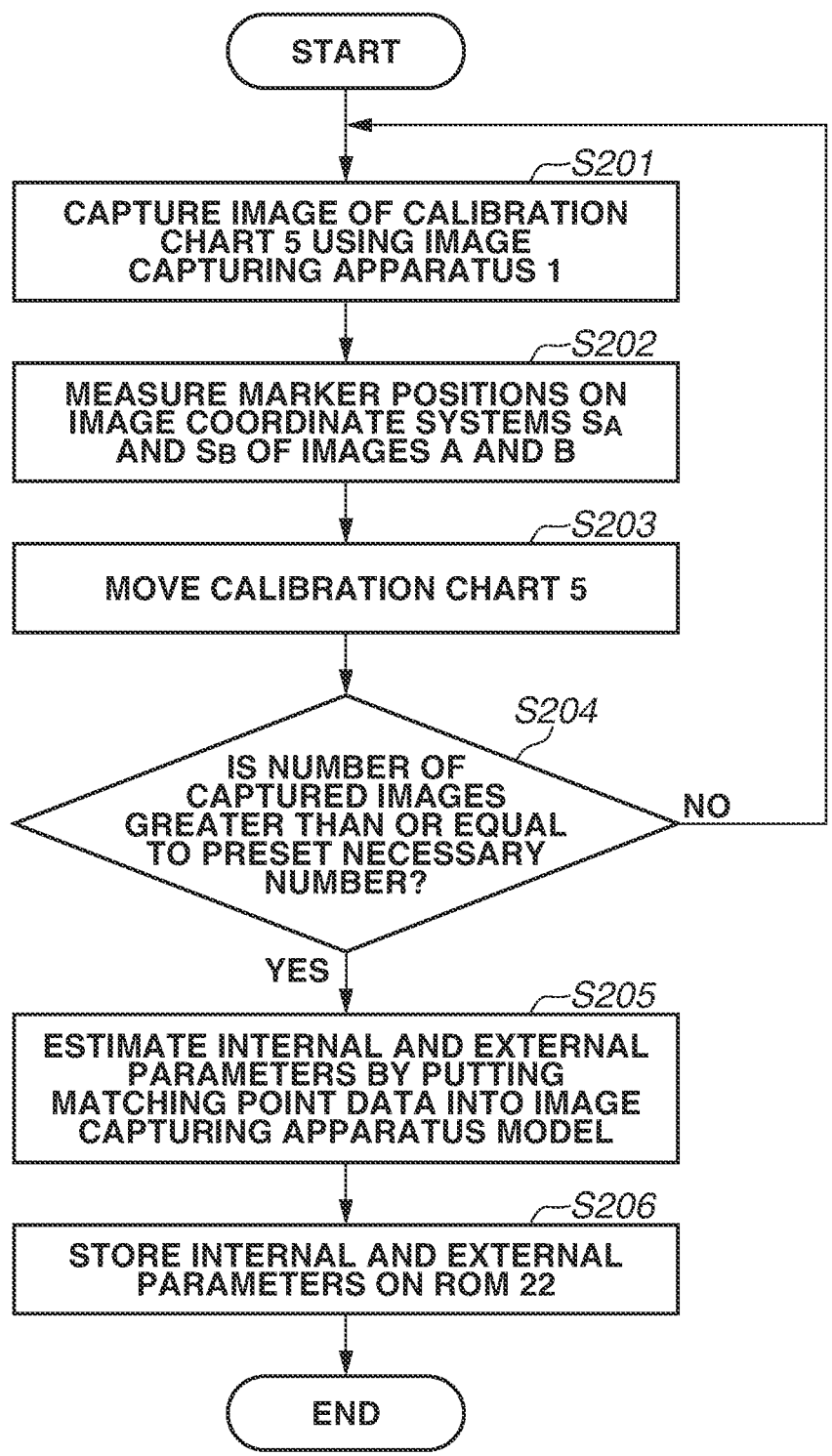
FIG. 8 is a flowchart illustrating a detailed process of step S101 in FIG. 6.

Next, details of the process in step S101 will be described below with reference to FIG. 8. FIG. 8 is a flowchart illustrating details of the process in step S101 according to the present exemplary embodiment. The process described in detail below is performed by the functional blocks (211 to 214) of the image processing apparatus 2.

First, in step S201, images of the calibration chart 5 are captured using the image capturing apparatus 1. The image capturing apparatus control unit 211 transmits a trigger signal to the image capturing apparatus 1, and the image capturing apparatus 1 transmits an image signal to the image processing apparatus 2. The images A and B, which are image signals, are loaded onto the RAM 23.

Next, in step S202, the position of each marker arranged on the calibration chart 5 in the image coordinate systems $S_A$ and $S_B$ of the images A and B is measured. The image processing unit 212 performs marker position measurement processing described above on the images A and B loaded on the RAM 23. Consequently, marker coordinates $m_{Ai}=(u_{Ai}, v_{Ai})$ on the image coordinate system $S_A$ and marker coordinates $m_{Bi}=(u_{Bi}, v_{Bi})$ on the image coordinate system $S_B$ are obtained, where i is a marker number. The image processing unit 212 loads the obtained marker coordinates $m_{Ai}$ and $m_{Bi}$ as matching point data onto the RAM 23.

Next, in step S203, the calibration chart 5 is moved so that the position and orientation of the calibration chart 5 are changed. This operation is conducted to acquire a large number of marker coordinates $m_{Ai}$ and $m_{Bi}$ that are matching point data. The operation can be performed manually by an operator, or the calibration chart 5 can be moved automatically by an automatic stage (not illustrated) or a robot apparatus (not illustrated).

Next, in step S204, whether the number of captured images of the calibration chart 5 is greater than or equal to a preset number is determined. In a case where the number of captured images is greater than or equal to the present number (YES in step S204), the processing proceeds to next step S205. On the other hand, in a case where the number of captured images is less than the present number (NO in step S204), the processing returns to step S201 to capture images of the calibration chart 5 again.

The number is preset by an operator, and the value of the number is stored on the ROM 22. As the number of captured images is increased, the calibration accuracy increases, but the operation time also increases, so that the number is determined based on the calibration accuracy and the allowed operation time. In a case where the number of markers on the calibration chart 5 is large, a large number of pieces of matching point data can be acquired in one operation, so that the number can be decreased. In general, the number of captured images is approximately 10 to 50.

Next, in step S205, the internal and external parameters estimation processing is performed using the matching point data and the image capturing apparatus model. The marker coordinates $m_{Ai}$ and $m_{Bi}$ that are stored on the RAM 23 in step S202 are read. The matching point data is substituted into formula 14. Then, the optimization calculation of formula 14 is solved to obtain a fundamental matrix F':

$$\min_{F'} \sum_i (m_{Ai}^T F' m_{Bi})^2. \quad \text{[Formula 15]}$$

Figure 9:
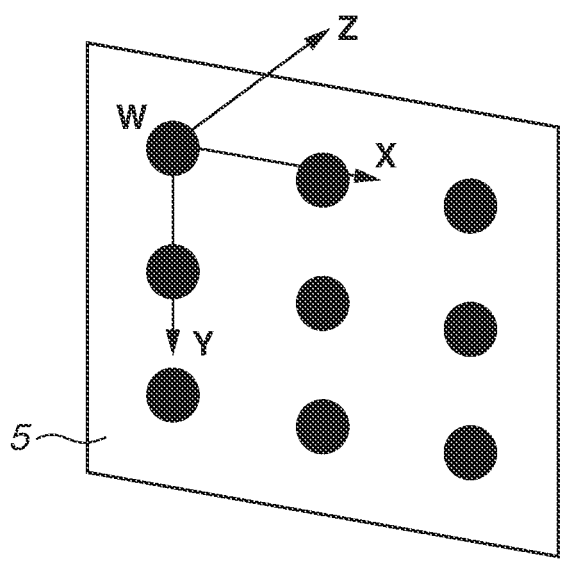
FIG. 9 is a schematic view illustrating a calibration chart according to an exemplary embodiment.

As illustrated in FIG. 9, the upper left marker in the world coordinate system W on the calibration chart 5 is defined as an origin, the normal direction of the calibration chart 5 as a z-axis, the direction from the upper left marker to the upper right marker as an x-axis, and the cross product of the x- and z-axes as a y-axis. If each marker is drawn with great accuracy when the calibration chart 5 is generated, each marker position in the world coordinate system W is determined with great accuracy.

As described above, theoretically, if there are five known points in the world coordinate system W, the internal and external parameters can be derived from the fundamental matrix F. Thus, if the world coordinate system W is defined as described above, the internal and external parameters can be estimated from the fundamental matrix F' with great accuracy. Then, in step S206, the calibration calculation unit 213 stores the estimated internal and external parameters on the ROM 22. Then, step S101 is ended.

Next, the three-dimensional measurement processing performed in steps S102 to S105 in FIG. 6 will be described below. As illustrated in FIG. 6, first, in step S102, images of a measurement target on which the three-dimensional measurement is to be performed are captured using the image capturing apparatus 1. The image capturing apparatus control unit 211 transmits a trigger signal to the image capturing apparatus 1, and the image capturing apparatus 1 transmits an image signal to the image processing apparatus 2. The images A and B, which are image signals, are loaded onto the RAM 23.

Next, in step S103, stereo rectification processing is performed. The stereo rectification is a method for projecting a captured image so that the matching points in the images A and B have the same row coordinates. Performing the processing in step S103 produces a benefit that the processing is simplified because the search for stereo matching point, which is a two-dimensional matter, becomes a one-dimensional matter.

The stereo rectification processing in step S103 will be described briefly below. First, lens distortion correction is performed on the images A and B using formula 1 and the lens distortion characteristic that is part of the internal parameter, and a lens distortion correction image is generated. Next, a projection matrix with which the optical centers A and B have the same height and the optical axis directions are parallel is calculated using the internal and external parameters. The projection matrix is reflected in the lens distortion correction image so that a stereo-rectified image is generated.

Next, in step S104, a parallax is calculated by matching the images A and B having undergone the stereo rectification processing. Examples of a matching method include a region-based matching method and a feature-based matching method, and a suitable method for the purpose is selected. Examples of a region-based matching method include a sum of absolute differences (SAD) method, a sum of squared differences (SSD) method, and a normalized cross correlation (NCC) method. The parallax calculated in step S104 is denoted by d, and the measurement coordinates on the image coordinate system $S_A$ are $m_A=(u_A, v)$, and the measurement coordinates on the image coordinate system $S_B$ are $m_B=(u_B, v)$. Since the stereo rectification processing is previously performed, the values of the row coordinates y are the same values.

Lastly, in step S105, three-dimensional measurement is performed using the calibration result and the parallax amount. At this time, the coordinates (x, y, z) of the measurement point in the image capturing apparatus coordinate system $S_A$ are expressed as:

$$x = \frac{b(u_A + u_B)}{2d},$$
$$y = \frac{bv}{d},$$
$$z = \frac{bf}{d}$$

[Formula 16]

based on the triangulation principle.

In formula 16, f is the focal length after the stereo rectification processing, and b is the baseline length determined based on the external parameter after the stereo rectification processing.

While the direction in which the photoelectric conversion elements 32A and 32B are arranged is defined as the x-axis and the external parameter is modeled using formula 10 in the present exemplary embodiment, the arrangement direction can be defined as the y-axis and the external parameter can be modeled using formula 17:

$$E' = \begin{pmatrix} 1 & 0 & 0 & 0 \\ 0 & 1 & 0 & t^2 \\ 0 & 0 & 1 & 0 \end{pmatrix}. \quad \text{[Formula 17]}$$

According to the present exemplary embodiment, in view of the optical characteristics of the image capturing apparatus having a short baseline length, the model for calculating the external parameter is determined at single degree of freedom. Especially, the image capturing apparatus that employs the image capturing plane phase-difference method according to the present exemplary embodiment divides the pupil region of the single lens and acquires the images A and B captured by the single image sensor, so that the baseline length is less than or equal to a lens diameter, and the baseline length tends to be significantly short with respect to the image capturing apparatus. However, since the single lens is employed, if the single image capturing apparatus is constrained under a predetermined condition, the two optical centers are less likely to be relatively displaced. Based on this fact, the model for calculating the external parameter is modeled as a single-degree-of-freedom model. In this way, the method for calculating the external parameter by modeling the image capturing apparatus, in which an external parameter error is likely to occur if the image capturing apparatus has a short baseline length, can be applied without a problem, and the measurement accuracy increases significantly.

Further, since the model is a single-degree-of-freedom model, the calculation load in calculating the external parameter is also reduced.

Further, the present exemplary embodiment uses the model that represents the relative positional relationship between the exit pupils 41A and 41B of the lens as the degree of freedom. This makes it possible to address a case where the positions of the exit pupils 41A and 41B with respect to the image sensor 11 are changed when, for example, the lens is replaced.

In the first exemplary embodiment described above, the internal parameters A and B are modeled using different variables. However, since the image capturing apparatus 1 used in the first exemplary embodiment uses the same lens 12 and the same image sensor 11, the images A and B are images that are formed through substantially the same optical characteristics. Thus, in a second exemplary embodiment, the internal parameters A and B other than the image center are modeled using the same variable.

A hardware configuration and a control system configuration that are different from those in the first exemplary embodiment will be illustrated and described below. Further, each portion similar to that in the first exemplary embodiment is considered to have a similar configuration and act similarly, and detailed description thereof is omitted.

Internal parameter matrices $A_A$ and $A_B$ determined from an internal parameter other than the lens distortion characteristics are defined as:

$$A_A = \begin{pmatrix} fk & 0 & u_{A0} \\ 0 & fk & v_{A0} \\ 0 & 0 & 1 \end{pmatrix}, \quad \text{[Formula 18]}$$

and $$A_B = \begin{pmatrix} fk & 0 & u_{B0} \\ 0 & fk & v_{B0} \\ 0 & 0 & 1 \end{pmatrix}. \quad \text{[Formula 19]}$$

In formulas 18 and 19, f is the focal length of the exit pupils 41A and 41B, k is the cell (pixel) size of the image sensor 11, $(u_{A0}, v_{A0})$ is the image center of the image coordinate system $S_A$, and $(u_{B0}, v_{B0})$ is the image center of the image coordinate system $S_B$.

With the technique described above, the number of variables that define the model of the image capturing apparatus 1 are reduced, so that the calculation time of the optimization function expressed by formula 14 is reduced. Further, since the constraint condition that the internal parameters A and B are equal is used, an estimation error which results in much difference between the internal parameters A and B is prevented.

While all the internal parameters are modeled using the same variable in the present exemplary embodiment, only some of the parameters may be modeled using the same variable.

In the first and second exemplary embodiments described above, each processing procedure is executed by the CPU 21 of the image processing apparatus 2. Alternatively, a control program of software capable of executing the above-described functions and a recording medium that records the program can be installed in another electronic device and implemented.

Accordingly, the control program of the software capable of executing the above-described functions, the recording medium that records the program, the electronic device, and the application constitute the disclosure.

Further, while the case where the computer-readable recording medium is a ROM or RAM and the control program is stored on the ROM or the RAM is described above in the exemplary embodiments, the disclosure is not limited to the disclosed form.

The control program for implementing the aspect of the embodiments can be recorded on any computer-readable recording medium. Examples of a recording medium for supplying the control program include a hard disk drive (HDD), an external storage apparatus, and a recording disk.

Other Exemplary Embodiments

Further, a multi-joint robot arm and various robot arms including a joint of a different form, such as a parallel link robot arm, are applicable to a robot apparatus according to the first and second exemplary embodiments. Further, a driving source that drives each joint can be, for example, a device such as an artificial muscle. Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Further, the above-described first and second exemplary embodiments are applicable to a machine that can automatically perform expansion/contraction operations, bending/stretching operations, upward/downward operations, rightward/leftward operations, turning operations, or a combination thereof based on information on a storage apparatus of a control apparatus.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-094047, filed May 17, 2019, which is hereby incorporated by reference herein in its entirety.

What is claimed is:

1. An apparatus comprising:
a first unit configured to perform three-dimensional measurement based on an image captured by an image sensor on which an optical image of a subject is formed via a lens having a first pupil region and a second pupil region; and
a second unit configured to set a parameter used in the three-dimensional measurement by using a model,
wherein in the model, a component of a first relative positional relationship between in the first pupil region and the second pupil region is expressed at a single degree of freedom.

2. The apparatus according to claim 1, wherein the lens and the image sensor are constraineed with each other.

3. The apparatus according to claim 1, wherein only the component is variable in the model.

4. The apparatus according to claim 1, wherein the second unit sets the parameter further using an image acquired by capturing an image of a marker.

5. The apparatus according to claim 4, wherein the image sensor includes:
a first pixel configured to receive a first light ray which passes through the first pupil region; and
a second pixel configured to receive a second light ray which passes through the second pupil region, and wherein the second unit sets a parameter corresponding to a second relative positional relationship between the first pixel and the first pupil region, and sets a parameter corresponding to a third relative positional relationship between a the second pixel and the second pupil region, by using the image of the marker and the first relative positional relationship.

6. The apparatus according to claim 4, wherein the marker includes five or more markers.

7. A system comprising:
the apparatus according to claim 1; and
a robot apparatus,
wherein the robot apparatus is controlled based on a result of the three-dimensional measurement.

8. A method for manufacturing an article using the system according to claim 7, comprising:
holding a first target object by the robot apparatus; and
attaching the first target object to a second target object by the robot apparatus.

9. The apparatus according to claim 4, further comprising:
the lens; and
the image sensor.

10. The apparatus according to claim 1, wherein the model is expressed by a matrix.

11. The apparatus according to claim 1, comprising a third unit configured to perform image processing on the image captured by the image sensor.

12. The apparatus according to claim 11, wherein the third unit obtains a data to set the parameter by the image processing.

13. The apparatus according to claim 1, wherein pixels are arranged in the image sensor, each of the pixels includes a first photoelectric conversion element, a second photoelectric conversion element and a microlens over the first photoelectric conversion element and the second photoelectric conversion element.

14. The apparatus according to claim 4,
wherein pixels are arranged in the image sensor, each of the pixels includes a first photoelectric conversion element, a second photoelectric conversion element and a microlens over the first photoelectric conversion element and the second photoelectric conversion element, and
wherein the second unit is configured to set a parameter corresponding to a second relative positional relationship between the first photoelectric conversion element and the first pupil region, and set a parameter corresponding to a third relative positional relationship between the second photoelectric conversion element and the second pupil region, by using the image of the marker and the first relative positional relationship.

15. The apparatus according to claim 1, comprising a processor which executes a control program to realize the function of the first unit and the second unit.

16. An image capturing apparatus comprising:
a lens; and
a processing unit,
wherein the lens includes:
a first region through which a first light ray passes; and
a second region through which a second light ray passes,
wherein the first region and the second region are arranged side by side in a predetermined direction, and
wherein the processing unit sets a component of the predetermined direction as a degree of freedom in a first relative positional relationship between a predetermined position in the first region and a predetermined position in the second region, wherein the processing unit sets the first relative positional relationship further using an image acquired by capturing an image of an apparatus provided with a marker, wherein the image capturing apparatus further includes an image sensor, wherein the image sensor includes:

a first pixel configured to receive the first light ray; and a second pixel configured to receive the second light ray, and wherein the processing unit sets a second relative positional relationship between a predetermined position in the first pixel and the predetermined position in the first region and a third relative positional relationship between a predetermined position in the second pixel and the predetermined position in the second region using the image of the marker and the first relative positional relationship, and wherein a model is set so that a distance between the predetermined position in the first pixel and the predetermined position in the first region and a distance between the predetermined position in the second pixel and the predetermined position in the second region are equal.

17. A method for three-dimensional measurement based on an image captured by an image sensor on which an optical image of a subject is formed via a lens having a first pupil region and a second pupil region, comprising:

setting a parameter by using a model (matrix E', T'); and performing the three-dimensional measurement by using the parameter, wherein, in the model, a component of a first relative positional relationship between the first pupil region and the second pupil region is expressed at a single degree of freedom.

18. The method according to claim 17, further comprising:

capturing an image of a marker; and setting the parameter using the image of the marker and the model.

19. The method according to claim 18, comprising:

setting a parameter corresponding to a second relative positional relationship between a first photoelectric conversion element of the image sensor and the first pupil region by using the image of the marker and the first relative positional relationship; and setting a parameter corresponding to a third relative positional relationship between the second photoelectric conversion element of the image sensor and the second pupil region, by using the image of the marker and the first relative positional relationship.

20. A non-transitory computer-readable recording medium that records a control program for executing the image processing method according to claim 17.

* * * * *